United States Patent [19]

Dillner

[11] Patent Number: 4,729,804

[45] Date of Patent: Mar. 8, 1988

[54] METHOD FOR SECURING A WORKPIECE TO A WORKHOLDER

[75] Inventor: James R. Dillner, Hebron, Conn.

[73] Assignee: United Technologies Corporation, Hartford, Conn.

[21] Appl. No.: 946,474

[22] Filed: Dec. 24, 1986

Related U.S. Application Data

[62] Division of Ser. No. 829,050, Feb. 13, 1986, Pat. No. 4,685,660.

[51] Int. Cl.[4] .................. B32B 31/06; B32B 7/04
[52] U.S. Cl. ........................... 156/91; 156/289; 264/274; 269/7; 269/289 R
[58] Field of Search ............... 51/216 LP, 216 R, 277; 156/91, 92, 155, 289; 269/7, 289 R; 264/274

[56] References Cited

U.S. PATENT DOCUMENTS

| | | | |
|---|---|---|---|
| 2,937,437 | 5/1960 | Cole et al. | 29/424 |
| 3,526,397 | 9/1970 | Verguson | 269/7 |
| 3,586,559 | 6/1971 | Shepard | 156/155 |
| 3,897,535 | 7/1975 | Lapac et al. | 264/268 |
| 3,921,343 | 11/1975 | Speyer | 51/323 |
| 4,081,928 | 4/1978 | Kinnebrew et al. | 51/216 R X |
| 4,132,689 | 1/1979 | Speyer | 260/23 R |
| 4,285,902 | 8/1981 | Braverman | 264/274 X |
| 4,420,354 | 12/1983 | Gougeon et al. | 264/274 X |

FOREIGN PATENT DOCUMENTS

| | | | |
|---|---|---|---|
| 1485417 | 9/1977 | United Kingdom. | |
| 619321 | 8/1978 | U.S.S.R. | 269/7 |
| 895609 | 1/1982 | U.S.S.R. | 269/7 |

Primary Examiner—Robert A. Dawson
Attorney, Agent, or Firm—William J. Sapone

[57] ABSTRACT

A workholder (6) has a contoured bonding surface (7), which essentially matches a contoured surface (4) of an airfoil (1). A plurality of studs (8) are disposed within a plurality of tapped holes (9) located about the workholder bonding surface. In operation, the studs are extended outwardly from the surface, and both the studs and bonding surface are contacted with a release agent (10). A curable resinous material (11) is applied to the bonding surface and studs, and an airfoil positioned next to the bonding surface, sandwiching the resinous material therebetween. After curing, a plurality of tapped holes (13) are formed in resin layer (11), with the extended studs fixably positioning the airfoil relative to the workholder. Removing the studs provides heatless release of the airfoil from the workholder.

2 Claims, 5 Drawing Figures

METHOD FOR SECURING A WORKPIECE TO A WORKHOLDER

This application is a division of application Ser. No. 829,050, filed on Feb. 13, 1986 and now U.S. Pat. No. 4,685,660.

TECHNICAL FIELD

This invention relates to fixturing apparatus and more particularly to a workholder and method for securing a workpiece thereto.

BACKGROUND ART

Generally, a workpiece is secured to a workholder to prevent movement of the workpiece during subsequent machining, milling, or other finishing operations. Clamping or other such mechanical means are well known in the art for attaching a workpiece to a workholder. However, delicate items, such as an airfoil blade, comprising essentially a thin metal plate having critically contoured surfaces on opposite sides, could be damaged by such mechanical attaching means. Since precise machining is required to produce an airfoil blade having aerodynamically shaped surfaces, precise fixturing is required to hold such a blade during the finishing operation. Movement or improper positioning of the workpiece could easily result in damage to the critical surfaces.

In commonly assigned U.S. Pat. No. 3,586,559 to Shepard et al, a method is disclosed for applying a melted wax-like thermoplastic composition to a workpiece and workholder, which, after cooling, forms an interlayer which bonds the workpiece and workholder together. The wax-like composition and workholder are heated to melt the composition before application and then again after finishing to release the workpiece from the workholder. Generally, such a workholder is constructed with a plurality of internal heating elements imbedded beneath the bonding surface, with the elements capable of heating the workholder to melt the bonding composition. The processing steps include heating the workholder, applying the bonding composition to the workholder, positioning the workpiece on the workholder and cooling the assembly. After finishing, the assembly is heated to melt the bonding composition and thereby free the workpiece. While such a process has been used successfully on many items, there are several limitations.

To insure uniform heating of the workholder bonding surface, a plurality of uniformly disposed electrical heating elements are imbedded under the workholder bonding surface and connected to a power source by a plurality of interconnecting wires. Generally, a workholder having imbedded heating elements is very costly and difficult to construct. This is particularly true for workholders having surfaces which conform to workpieces of complex shape or which require a large bonding surface. In addition, differences in the rate of thermal expansion between the elements, wires and workholder can cause fatigue after a number of heating cycles, resulting in individual element failure. Such failures cause cold spots on the bonding surface, slowing both the bonding and release of a workpiece from the workholder, thereby lengthening processing time.

Another problem involves premature release of the workpiece from the workholder. Generally, a finishing operation, such as milling or grinding, may generate sufficient frictional heat to cause a release of the workpiece from the workholder during finishing. Should this occur, the article may be rendered unusable due to inaccurate machining. The use of thermosetting compositions, which have a higher thermal resistance than thermoplastic compositions, such as the wax-like composition, reduces the likelihood of frictional heat release. However, since such compositions require an even higher temperature to release the workpiece from the workholder, a greater amount of time and energy are required to fix and release a workpiece during the fixturing operation.

DISCLOSURE OF THE INVENTION

It is an object of the present invention to provide a workholder which does not require heating to either secure or release a workpiece bonded thereto.

It is a further object of the present invention to provide a fixturing method which optimizes energy use and minimizes processing time.

It is yet a further object of the present invention to provide a workholder and method that assure precise fixturing of workpieces having complex shapes or large bonding surfaces during finishing operations.

These and other objects of the present invention are achieved by utilizing a workholder having a contoured surface essentially matching a contoured surface of a workpiece, and, having means for releasably engaging a cured resinous material. In the preferred embodiment, such means comprise a plurality of studs disposed within a plurality of tapped holes located about the workholder bonding surface. The studs extend outwardly from the contoured bonding surface to a length sufficient to allow threaded engagement of a resinous material.

The method for utilizing such a workholder comprises the steps of configuring the engaging means for resinous engagement, coating the contoured surface and engaging means with a releasing agent which prevents chemical bonding of the resinous material to the workholder, positioning a workpiece relative to the workholder, contacting the workpiece, workholder and engaging means with the resinous material, sandwiching the resin therebetween, and, curing the resin. This bonds the workpiece to the resin layer which is, in turn, precisely held by the engaging means. After the finishing process has been completed, the workpiece and resin are disengaged from the workholder using the releasable engaging means. Where studs are used as the engaging means, this involves backing the threaded ends out of the cured resin layer. Using releasable engaging means to free the workpiece from the workholder provides heatless fixturing and release, saving considerable time by eliminating heating and cooling steps which would otherwise be required to perform this operation according to the prior art.

BEST MODE FOR CARRYING OUT THE INVENTION

Figure 1:
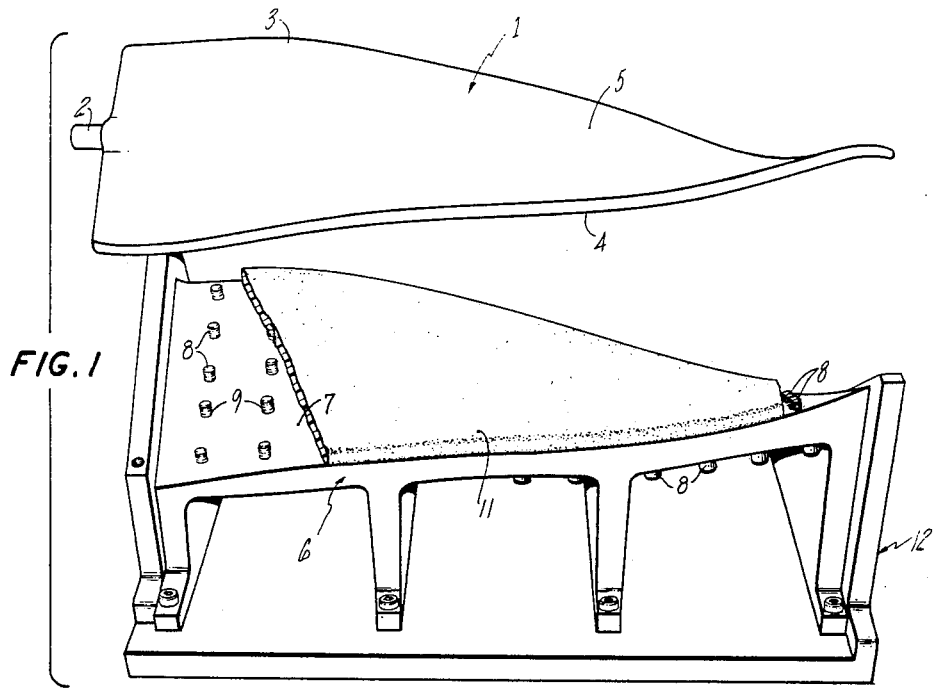
FIG. 1 is a perspective view of a typical airfoil article and the preferred embodiment of the workholder of the present invention.
Figure 2:
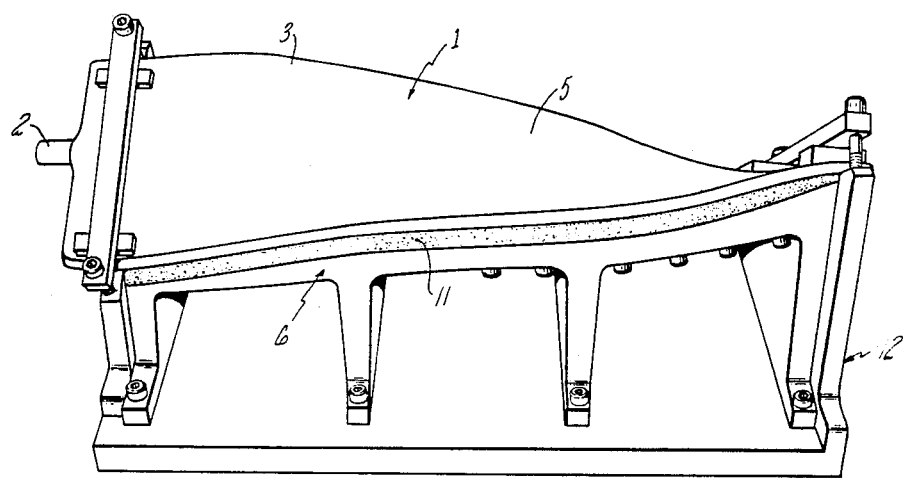
FIG. 2 is an elevation showing the workholder of the present invention engaging a sandwiched resinous layer which is bonded to an airfoil article.

For illustrative purposes, the fixturing of an airfoil article to the preferred embodiment of the workholder of the present invention will be discussed. Referring to FIG. 1, an airfoil 1 has a root 2 and a blade 3, with the airfoil having opposite aerodynamically contoured surfaces 4 and 5, which require precision milling as a finishing operation. Such an airfoil may be approximately 30 inches in length from root to tip and approximately 12 inches wide at the root. While milling is illustrative of the present invention, any operation requiring precise fixturing of a workpiece can utilize this invention. Referring to FIG. 1, a workholder 6 has a contoured bonding surface 7 which essentially matches the first contoured surface 4 of airfoil 1. The illustrative workholder has means for releasably enqaging a curable resinous material. For illustrative purposes, the releasable engaging means comprise a plurality of studs 8 extending through a plurality of tapped holes 9 in contoured surface 7 of workholder 6. Such studs are extendable outwardly from the contoured surface to a length sufficient to allow thread engagement of an after applied curable resinous material. In this example, about a ½" extension is sufficient.

Figure 3A:
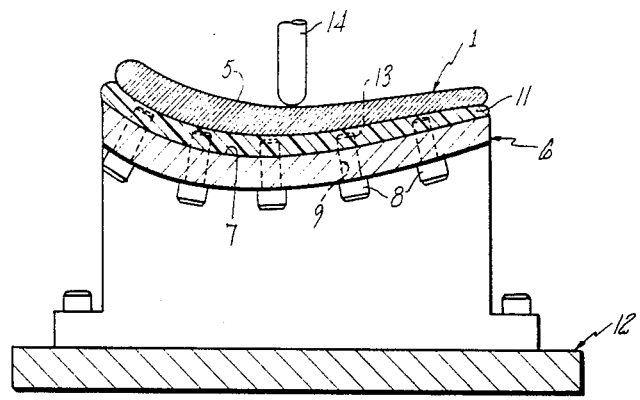
FIGS. 3A, 3B and 3C are sectional illustrations of an airfoil article undergoing a typical two sided finishing operation utilizing the workholder of the present invention.

Referring to FIG. 3A, the preferred embodiment of the method for utilizing the workholder of the present invention involves first threading studs 8 through the tapped holes 9, on contoured surface 7, extending a threaded portion of the studs outwardly about ½" from the contoured bonding surface 7. A release agent 10 (not shown) such as Miller-Stevenson MS-122, which prevents the adhesion of a resinous material to a contiguous article, is applied to the contoured surface 7 and extended studs 8. A curable resinous material 11, preferably an epoxy resin such as REN 3262 manufactured by REN Plastics Corporation, is applied to the contoured surface and extending studs on the workholder surface. While resin 11 is still pliable, airfoil 1 is fixably located relative to the workholder 6, and properly referenced to a machining alignment apparatus 12, sandwiching resin 11 between airfoil 1 and workholder 6 and thereby forcing resin 11 into the voids between the threads of extended studs 8. In another embodiment, airfoil 1 is first properly referenced to machining alignment apparatus 12, with resin 11 forced into the space between airfoil 1 and contoured surface 7. In either embodiment, the sandwiched resin forms a layer and is cured, usually by undergoing a self contained catalytic reaction.

Figure 3B:
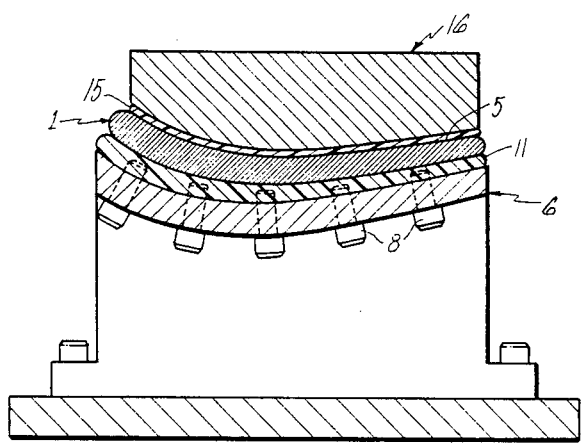
Figure 3C:
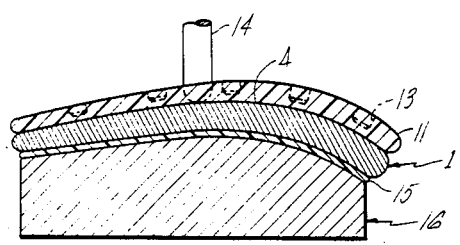

Upon curing, airfoil 1 is bonded to resin layer 11. The resin which filled the voids between the threads of studs 8, forms a plurality of tapped holes 13, within layer 11, firmly attaching the cured resin layer 11 to workholder 6. Machining or other finishing operations may now be performed on second contoured surface 5 of airfoil 1. For illustrative purposes, airfoil 1 is shown undergoing a milling operation performed by a cutter 14. After milling, the airfoil is disengaged from the workholder by removing the studs from the cured resin, in this case, by backing them out of the formed tapped holes 13 in resin layer 11.

Where machining is required on both sides of an article, as is usually required with airfoil surfaces, additional steps are required. Referring to FIG. 3B, after completing finishing operations to the second surface 5, and before disengagement, a layer of resin 15 is applied to second surface 5 of airfoil 1. A second fixturing device 16 is positionally fixed relative to surface 5, sandwiching the resin therebetween. No engaging means or release agent are required on second fixture 16. After curing, second fixture 16 is bonded to second surface 5. Airfoil 1 is then disengaged from workholder 6 by removing studs 8. Referring to FIG. 3C, airfoil 1 and second fixture 16 are then rotated 180° and first contoured surface 4 machined by cutter 14 through resin layer 11. After the finishing operation is completed, the airfoil and fixture are placed in a furnace and heated to release the airfoil from fixture 16 and burn off any remaining resin. Such a fixturing method avoids several intermediate heating and cooling steps, significantly saving both processing time and energy.

While the preferred embodiment of the present invention is described in relation to a workholder having a plurality of studs extending through a contoured bonding surface having a plurality of tapped holes, this invention is applicable to any workholder having means for releasibly engaging a resin layer used for bonding a workpiece to a workholder. Therefore, it will be understood by one skilled in the art that any modifications in terms of engaging means, workholder contoured surface or curable resinous material can be made without varying from the scope of the present invention.

I claim:

1. A method for fixing a workpiece to a workholder, utilizing a curable resinous material, said method comprising the steps of:
   (1) providing a workholder which comprises a body having a contoured bonding surface essentially matching a surface of said workpiece and having means disposed about said body for releasably engaging said resinous curable material, said means configured for engagement with said material and comprising a plurality of removable members disposed within a plurality of holes located about the contoured bonding surface of said body, said members having an engaging end extendable into said resinous material, said resinous material flowable around said end and, after curing, forming corresponding holes in said cured resinous material, said ends engaging said resinous material, fixably positioning said resinous material, and thus said workpiece, relative to said workholder;
   (2) applying a release agent to said contoured bonding surface and said engaging means;
   (3) positioning said workpiece relative to said contoured surface;
   (4) contacting said workpiece, said contoured bonding surface and said engaging means with said resinous material, sandwiching said material between said workpiece and said workholder; and
   (5) curing said resinous material, such that said workpiece is bonded to said resinous material, with said engaging means fixably positioning said resinous material, and thus said workpiece, relative to said workholder, said workpiece releasably fixed to said workholder.

2. The method of claim 1 wherein said removable members comprise studs disposed within a plurality of tapped holes, said studs having a thread length sufficient to extend into said resious material, said resinous material flowable into voids between the threads of said studs and after curing forming tapped holes in said cured resinous material.

* * * * *